US009528901B2

(12) United States Patent
Kiesbauer

(10) Patent No.: US 9,528,901 B2
(45) Date of Patent: Dec. 27, 2016

(54) DEVICE AND METHOD FOR QUANTIFYING A LEAKAGE FLOW ON AN ACTUATOR

(71) Applicant: Joerg Kiesbauer, Eppertshausen (DE)

(72) Inventor: Joerg Kiesbauer, Eppertshausen (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 356 days.

(21) Appl. No.: 13/967,663

(22) Filed: Aug. 15, 2013

(65) Prior Publication Data

US 2014/0047902 A1      Feb. 20, 2014

(30) Foreign Application Priority Data

Aug. 16, 2012   (DE) .................. 10 2012 016 295

(51) Int. Cl.
  *G01M 3/24*      (2006.01)
  *G01M 3/02*      (2006.01)
  *G01M 3/28*      (2006.01)
  *F16K 37/00*     (2006.01)

(52) U.S. Cl.
  CPC ............ *G01M 3/02* (2013.01); *F16K 37/0075* (2013.01); *G01M 3/24* (2013.01); *G01M 3/2876* (2013.01)

(58) Field of Classification Search
  CPC  F16K 37/0083; F16K 37/0091; F15B 19/005; G01M 3/24; G01M 3/243; G01N 29/14; G01N 29/46; Y10T 137/8158; Y10T 137/8242; Y10T 137/8326
  USPC ...... 73/40, 47, 168, 592, 659; 340/605, 621; 137/551; 702/51
  See application file for complete search history.

(56) References Cited

U.S. PATENT DOCUMENTS

| 5,616,829 A * | 4/1997 | Balaschak ............. F16K 31/046 137/551 |
| 6,530,277 B2 * | 3/2003 | Kumpfmueller ... F16K 37/0083 73/168 |
| 7,940,189 B2 * | 5/2011 | Brown ................ F16K 37/0075 340/605 |

(Continued)

FOREIGN PATENT DOCUMENTS

| CA | 2129470 A1 | 2/1995 |
| DE | 19924377 | 12/2000 |

(Continued)

*Primary Examiner* — Hezron E Williams
*Assistant Examiner* — Gedeon M Kidanu
(74) *Attorney, Agent, or Firm* — Schiff Hardin LLP

(57) ABSTRACT

In a method or device for quantifying a leakage flow on a process control valve, an intact reference control valve is used to determine several reference flow values in advance by placing the reference control valve in several reference opening positions and measuring the respective reference flow value for each of the reference opening positions. When determining the respective reference flow value, a reference mechanical vibration acquired in an environment of the reference control valve is allocated to the respective reference flow value. An instantaneous mechanical vibration is determined on the process control valve when it is closed. The reference mechanical vibration coming closest to the determined instantaneous mechanical vibration is identified by an identity or approximation comparison. The leakage flow is equated with the reference flow value allocated to the identified reference mechanical vibration.

12 Claims, 3 Drawing Sheets

(56) References Cited

U.S. PATENT DOCUMENTS

| | | | |
|---|---|---|---|
| 8,429,951 B2 * | 4/2013 | Puttmer | F16K 37/0091 73/40.5 A |
| 2002/0062682 A1 * | 5/2002 | Kumpfmueller | F16K 37/0083 73/40.5 A |
| 2005/0126639 A1 * | 6/2005 | Ens | F16K 37/0083 137/554 |
| 2006/0191341 A1 | 8/2006 | Olesen et al. | |
| 2008/0121290 A1 * | 5/2008 | Pape | F15B 19/005 137/551 |
| 2009/0303057 A1 * | 12/2009 | Brown | F16K 37/0075 340/605 |
| 2010/0189580 A1 * | 7/2010 | Kyllingstad | F04B 51/00 417/437 |
| 2010/0192677 A1 * | 8/2010 | Puttmer | F16K 37/0083 73/40.5 A |
| 2011/0247484 A1 * | 10/2011 | Kiesbauer | F15B 15/1476 91/361 |
| 2012/0007743 A1 * | 1/2012 | Solomon | G01M 3/243 340/605 |
| 2012/0211097 A1 * | 8/2012 | Puttmer | F16K 37/0083 137/552 |
| 2013/0152673 A1 * | 6/2013 | Young | F23N 1/002 73/40.7 |

FOREIGN PATENT DOCUMENTS

| | | |
|---|---|---|
| DE | 10218830 C1 | 12/2003 |
| DE | 102007045529 | 4/2009 |
| EP | 0637713 A1 | 2/1995 |

\* cited by examiner

DEVICE AND METHOD FOR QUANTIFYING A LEAKAGE FLOW ON AN ACTUATOR

BACKGROUND

The disclosure relates to a method and a device for quantifying in particular a wear-induced leakage flow on a process control valve of a process field device that restricts a process stream, in particular with a constant stream pressure, wherein the process control valve is in the closed position.

During wear diagnosis, methods and process engineering is limited to identifying a leakage on a process control valve, for example by detecting when a no longer acceptable leakage state has been exceeded. Further information about wear progression as well as predictions of wear development can only be arrived at with complicated and expensive detection technology.

Process control valves, such as positioning valves or emergency check valves, are exposed to a stream of process fluid, which exhibits a varying composition depending on the process technology. A process fluid stream with a high percentage of solids causes more wear to the flow-regulating control valve. A wide variety of operating phenomena, such as corrosion, abrasion, cavitation or flashing, can also lead to increased wear on the valve unit. A worn valve unit of the control valve is first and foremost no longer able to sufficiently cut off the stream of process fluid. The leakage can result in a loss of product, and hence in a less efficient process, or in a safety risk to the entire system. Monitoring the leakage above all during operation of the process technology system is very important with respect to the operability and reliability of the actuator in the process technology system.

Literature about process technology involving control valves envisages solution approaches in which the so-called internal leakage in actuators is to be detected. Proposed in the article "Detektion der Innenleckage von Stellgeräten" ("Detection of Internal Leaks in Actuators") authored by Jörg Kiesbauer and Heinfried Hoffman (journal atp 42 (2000), issue 11) is a detection method in which a mechanical vibration sensor and positioner are used to acquire the presence or absence of smaller flow rates owing to the internal leakage.

Known from DE 10 2007 045 529 A1 is a diagnosis method for a control valve, such as a closing valve. In a first step, the stream pressure on the inlet line of the control valve is determined and compared with a first reference value corresponding to a family of characteristics or characteristic lines whose parameters are the Kv value and leakage class of the valve. In a second step, the mechanical vibration level is measured and compared with a second reference value, which is determined during startup as the sound level during the transition of a turbulent stream into a cavitation-affected stream. The known diagnosis method realizes a threshold-values analysis for the leakage situation.

SUMMARY

It is an object to overcome disadvantages of the prior art, in particular to provide a device and method for quantifying in particular a wear-induced leakage flow on a process actuator, wherein it is in particular possible to obtain more precise quantity data concerning the leakage.

In a method or device for quantifying a leakage flow on a process control valve, an intact reference control valve is used to determine several reference flow values in advance by placing the reference control valve in several reference opening positions and measuring the respective reference flow value for each of the reference opening positions. When determining the respective reference flow value, a reference mechanical vibration acquired in an environment of the reference control valve is allocated to the respective reference flow value. An instantaneous mechanical vibration is determined on the process control valve when it is closed. The reference mechanical vibration coming closest to the determined instantaneous mechanical vibration is identified by an identity or approximation comparison. The leakage flow is equated with the reference flow value allocated to the identified reference mechanical vibration.

DESCRIPTION OF EXEMPLARY EMBODIMENTS

Figure 1:
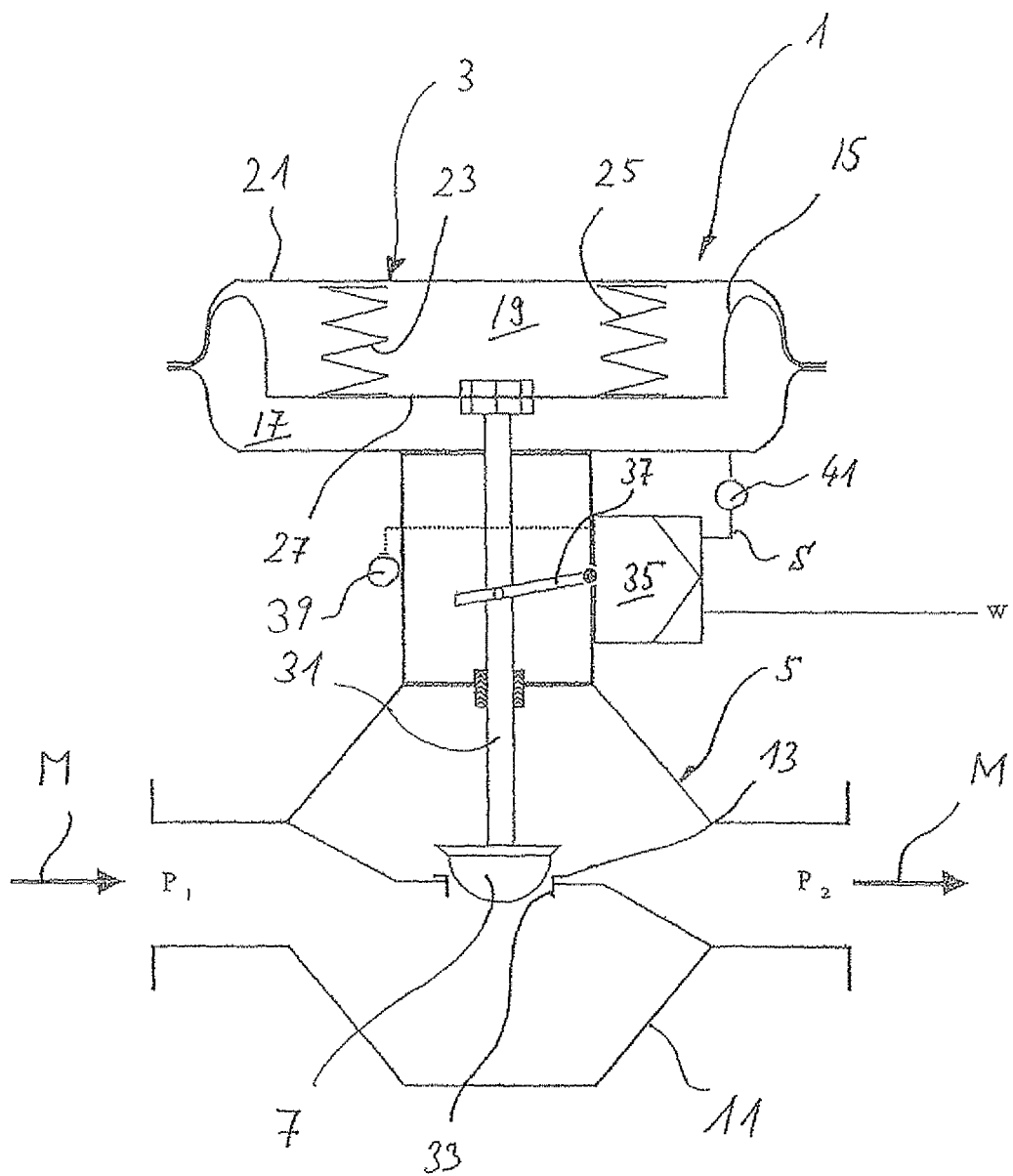
FIG. 1 is a schematic diagram of a pneumatic actuator according to an exemplary embodiment.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

A method and device for quantifying a leakage flow on a control valve that restricts a process stream in particular with a constant stream pressure is provided. When quantifying the leakage flow, the exemplary embodiment does not call for directly measuring the leakage flow with sensors, but rather using experience data acquired on a soundly operating reference control valve, especially one having the same design, or on the process valve itself when in new or mint condition. The method according to the exemplary embodiment can be divided into two procedural stages, a preparatory phase and an evaluation during the operation of the process control valve. In the preparatory phase, the intact reference control valve having the same or similar design is used to determine several reference flow values. This determination in advance can be made by means of actual sensors for determining the flow rate on the reference control valve. In doing so, the reference control valve is placed in several reference opening positions, and the respective reference flow value is measured for each reference opening position. For example, the reference flow value can be determined by calculating the position-dependent flow value via the position of the reference control valve and the prevailing constant process fluid stream pressure. At the same time, while determining the respective reference flow value, a reference mechanical vibration acquired in the environment of the reference control valve is recorded and stored, and allocated to the respective reference flow value. In this matter, clusters of value pairs are produced, according to which each reference mechanical vibration and stream pressure can be allocated to a specific reference flow value.

In the second phase of the method, an instantaneous mechanical vibration on the closed process valve is determined in real time, and a stream pressure is allocated, in particular from the history preceding closure of the process valve. Based on the determined instantaneous mechanical vibration, the reference mechanical vibration coming closest to the determined instantaneous mechanical vibration is identified by way of an identity comparison or approximation comparison, preferably essentially in real time. The stored value pairs now make it possible to determine the leakage flow to be quantified by equating the allocated reference flow value to the leakage flow via the identified reference mechanical vibration. The exemplary embodiment utilizes the surprising discovery that the vibration progression or sound progression of an intact reference control valve as it gradually opens from the closed position is identical or similar to that of a worn process control valve with a leak.

The comparability of sound levels is ensured above all if the process fluid stream pressure during an increase of the reference data corresponds to that of the real-time process operation. When generating the reference data, the intact control valve is opened either continuously or incrementally (0.1%, 0.2%, 0.5%, 1%, 2%, 3% . . . ), wherein the vibration level or sound level is recorded and stored at each opening position or continuously. Allocating the opening position given a known process fluid stream makes it possible to find out the process flow rate. If a process control valve is now monitored in real time, the instantaneous sound pressure values or instantaneous mechanical vibrations values enable an inference as to the leakage flow, because the allocation of sound levels can be used to determine the opening rate caused by the wear.

In a preferred exemplary embodiment of the invention, a reference process fluid stream pressure difference prevailing on the reference control valve, in particular a stream force or reference process fluid stream pressure difference, is acquired in advance during the preparatory phase. Several sets of sound-level/opening-position value pairs can be generated dependent on or as a function of the respectively prevailing process fluid stream pressure. The reference flow value can either be acquired directly by flow rate sensors, or indirectly based on the opening rate of the reference control valve and the acquired pressure values. While acquiring the instantaneous sound level in real time, the corresponding characteristic or characteristic line for the present constant process fluid stream pressure can be selected. The leakage flow can be inferred from the allocation of the reference mechanical vibration to the reference flow value. It is to be understood that sound and mechanical vibration or solid borne-sound are used as synonyms.

In a further development of the exemplary embodiment, the instantaneous stream force prevailing on the process valve is ascertained, in particular for defining the identity comparison or approximation comparison more precisely. The instantaneous stream force is preferably determined via a pneumatic driving pressure which is applied for keeping the process valve in its closed position.

Another embodiment of the method comprises that the instantaneous stream force prevailing on the process valve or an instantaneous flow just before the process control valve closes is determined and stored, and the reference mechanical vibration to be allocated for the leakage flow to be quantified is determined taking into account the instantaneous stream force measured prior to the closing process and the instantaneous mechanical vibration acquired after closure. Let it be clear that during allocation of the instantaneous mechanical vibration to a reference mechanical vibration, and hence to the flow, the instantaneous stream pressure must also be taken into account if it changes over time. However, if the stream pressure is only expected to vary slowly over time, the instantaneous stream pressure can advantageously be determined by acquiring the stream pressure before the process control valve closes.

In a preferred exemplary embodiment, the reference opening positions are selected in such a way that their passage cross sections correspond to typical leakage passage cross sections based on the wear history data of control valves corresponding to the design of the process valve. In this way, a most reliable estimation of the leakage flow value using the reference flow value can be realized.

In a further development of the exemplary embodiment, a sound level/opening position characteristic is generated for the intact reference control valve, so as to allocate each determined instantaneous mechanical vibration by way of the characteristic to a reference opening position to be equated with a leakage opening of the process control valve to. The leakage flow can be ascertained based on the prevailing process stream fluid pressure.

In a preferred exemplary embodiment, the instantaneous mechanical vibration or solid-borne sound is monitored, and in particular a warning signal is output, when a prescribed permissible reference mechanical vibration value has been exceeded.

In a preferred embodiment of the invention, a progression of the instantaneous mechanical vibration is acquired while opening the process valve, and compared with a reference progression of the reference mechanical vibration while opening the intact reference valve, so as to elicit details about the leakage state caused by wear.

In addition, the exemplary embodiment relates to a device for quantifying an instantaneous leakage flow on a process control valve that restricts a process stream in particular with a constant stream pressure. The device has a data memory that stores several reference flow values, which were determined using an intact reference control valve by moving the reference control valve into several reference opening positions and measuring the respective reference flow value for each respective reference opening position, and a reference mechanical vibration, which is measured for each respective reference opening position in the environment of each reference control valve and allocated to the respective reference flow value. In addition, the device has a mechanical vibration sensor for measuring instantaneous mechanical vibration or solid-borne sound sensor on the closed process control valve. Also provided in the device is data processing electronics, which based upon an identity comparison or approximation comparison identify the reference mechanical vibration coming the closest to the instantaneous mechanical vibration, and equate the reference flow value allocated to the identified reference mechanical vibration with the leakage flow to be quantified.

Let it be clear that the device according to the exemplary embodiment can be designed in keeping with the functional principle of the method of the exemplary embodiment.

An instantaneous operation parameter, like the instantaneous mechanical vibration, the instantaneous stream force, the instantaneous flow, etc., can be acquired by a respective sensor of the device according to the exemplary embodiment at a certain moment of operation time which is predetermined or determined by a controller. The progression of the instantaneous operation parameter refers to the development of its parameter values during a change of operation time and/or valve position.

Additional features, properties and advantages of the exemplary embodiment will be illustrated by the following description of an exemplary embodiment based on the attached drawings.

In FIG. 1, a pneumatic actuator according to the exemplary embodiment is generally marked with reference number 1, which encompasses a pneumatic actuating drive 3 and a control valve 5 with a valve unit 7. The valve unit 7 serves to set the flow of a process medium M through a pipe 11. The valve unit 7 can be translationally or translatorily displaced between a closed position indicated in FIG. 1 and an open position (not shown). In order to close the pipe, the valve unit rests on the valve seat 13. With the control valve 5 intact, barely any process medium M gets from one side of the pipe to the other.

The valve unit 7 is translatorily lifted and lowered toward the valve seat 13 by means of a pneumatic actuating drive 3, which is divided by an internal membrane 15 into a pneumatic working chamber 17 and return chamber 19. Situated inside of the drive housing 21 in the return chamber 19 are return springs 23, 25, which press against an adjustment plate 27 coupled to a driving rod 31. The compression springs 23, 25 cause a shift of the valve unit 7 toward the valve seat 13. In order to open the passage 33 on the valve seat, the pneumatic drive 3 is provided with a pneumatic set pressure S, which makes its way into the pneumatic working chamber 7, and causes the valve unit 7 to shift from the valve seat 13 and against the spring force of the compression springs 23, 25. The level of set-pressure S is calculated with a positioner 35, which receives an electrical set-point position signal W from a master console (not shown). The positioner receives the instantaneous position of the valve unit 7 from a position sensor 37. In addition, the positioner 35 receives sound level values from a sound level sensor 39, which is connected to the positioner 35. Also provided is a pressure sensor 41, which averages the set-pressure S and relays corresponding pressure measurement signals to the positioner 35.

The process medium M gets to the valve seat with a stream pressure P1, which in the process of the control valve is throttled to a stream outlet pressure P2. The pressure difference P1-P2 of the process medium stream causes a lift of the valve unit 7 against the spring forces applied by the compression springs 23, 25.

Figure 2:
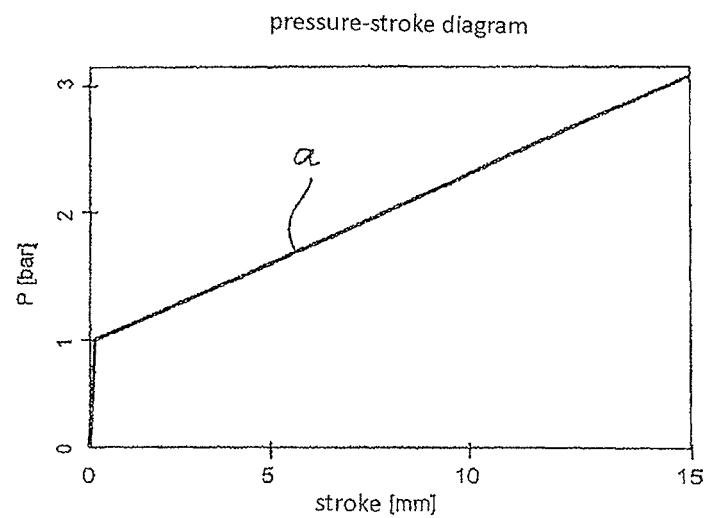
FIG. 2 is a set-pressure/stroke diagram, which models the so-called valve signature of the pneumatic actuator according to FIG. 1, in which the correlation between the pneumatic driving pressure and valve position is shown.
Figure 4:
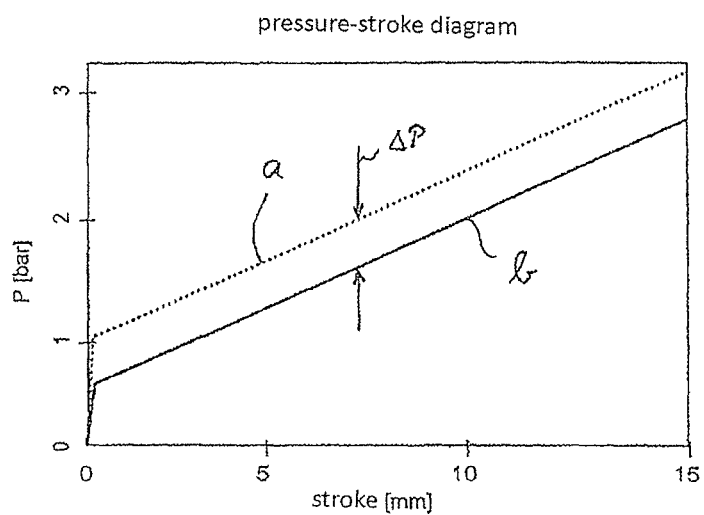
FIG. 4 is another set-pressure/stroke diagram, in which the set pressure is illustrated along with the valve position during process operation given a constant process medium pressure.

The positioner has a device for reporting a wear-induced leakage of the control valve 5, as well as for calculating the size or extent of the leakage. For this purpose, the positioner 35 has a data memory that stores a reference flow characteristic ascertained by means of an intact control valve 5. The characteristic is ascertained by building up a constant process fluid stream M inside the pipe 11. The intact control valve is then moved from the open position into the closed position, wherein the pneumatic set-pressure required for this purpose is measured via the sensor 41. The actually present stream pressure of the process medium M on the valve unit 7 can be determined using the so-called valve signature, a control valve-specific correlation between the set-pressure and the valve position depicted on FIG. 2 by curve a. For this purpose, the difference between the set-pressure according to the valve signature and the actually measured pneumatic set-pressure is calculated. FIG. 4 shows the valve signature in the form of the set-pressure/stroke curve a without the process medium with a dashed line. As in FIG. 2, the pneumatic actuating drive 3 requires at least 1 bar to bring the valve unit 7 out of the closed position against the compressive forces applied by the compression springs 23, 25. If the set-pressure S falls below the 1-bar limit, the compression springs 23, 25 cause the control valve 5 to close. The solid curve b according to FIG. 4 represents the actual pneumatic set-pressure as the valve positions move between 0 and 15 mm. As can be seen in FIG. 4, the pneumatic actuating drive 3 needs somewhat less than half the pneumatic set-pressure according to the valve signature. The pressure difference is generated by the stream pressure of the process medium M on the valve unit 7. In this regard, the ascertained signals can be used to ascertain the stream pressure ΔP on the valve unit 7, which is constantly held along the stroke positions of 0 to 15 mm owing to the constant process medium stream M. Based on the stream pressure ΔP and on the known valve position, a flow rate, i.e., the flow value, can be calculated, which is filed in the data memory of the positioner 35 as a reference.

Figure 3:
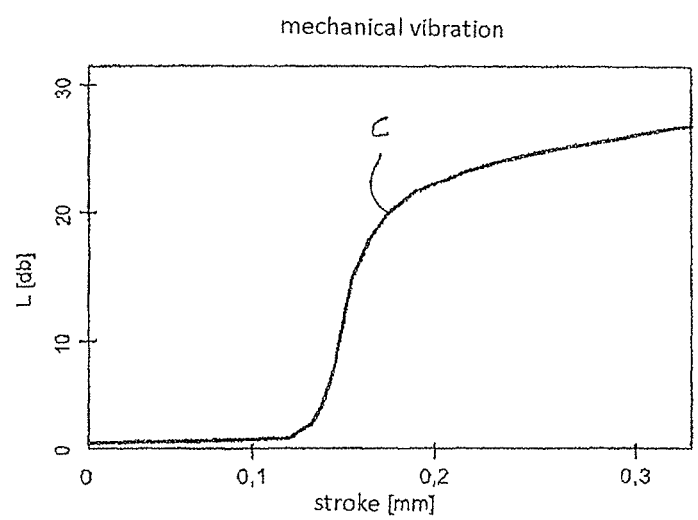
FIG. 3 is a mechanical-vibration/stroke diagram for an intact pneumatic actuator according to FIG. 1.

While measuring the pneumatic set pressure, the mechanical vibration is simultaneously determined via the sensor 37. FIG. 3 shows the progression of mechanical vibration of the slowly opening valve unit 7 which is not worn. The area in which the valve unit 7 is just leaving the valve seat 13 is here of special interest. This opening range lies between 0 and 0.3 mm. The mechanical vibration distribution along the valve stroke shown in FIG. 3 is a mechanical vibration curve of an intact control valve 5. This mechanical vibration characteristic c, in which the mechanical vibration of each valve position is allocated between 0 and 0.3 mm, for example, is filed in the data memory of the positioner 35.

In the method according to the exemplary embodiment and the device according to the exemplary embodiment, the wear-induced leakage flow on a control valve is now quantified by completely closing the control valve 5 with the control valve 5 in operation, which is detected by the position sensor 37. In the closed position, the sound level sensor 39 is used to acquire and record the mechanical vibration. In addition, the progression of mechanical vibration can be acquired in the critical opening range between 0 and 0.3 mm as characteristic d.

Figure 5:
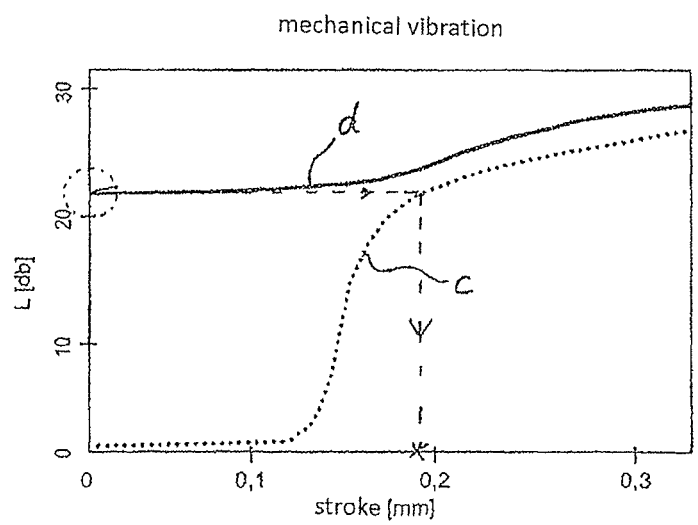
FIG. 5 is another mechanical-vibration/stroke diagram in which the mechanical vibration of a worn actuator is output to the mechanical vibration progression for an intact actuator dependent on the valve position.

In FIG. 5, the progression of mechanical vibration d for a worn control valve is contrasted with the mechanical vibration curve c represented by a dotted line. A mechanical vibration level of about 22 db already prevails with the valve actually in the completely closed position (at 0 mm stroke), which indicates a leakage flow on the valve unit 7. The positioner can already at this point display an alarm signal on the master console (not shown) indicating that a non-negligible leakage is present on the control valve. In addition, the measured sound level of 22 db makes it possible to precisely infer the quantity of leakage on the control valve. For this purpose, it is assumed that the mechanical vibration development or progression of a worn valve unit is the same as for an intact control valve opened to a correspondingly identical extent. This comparison is denoted by the dashed line on FIG. 5. Examining the mechanical vibration curve c with an eye toward when a 22 db mechanical vibration level is generated yields a valve opening of about 0.19 mm. As a consequence, it may be concluded with respect to wear on the valve unit 7 that there is a leakage opening approximately corresponding to a valve position of 0.19 mm of the intact control valve. The constant process medium pressure or flow rate given a correspondingly open control valve makes it possible to infer the actual leakage flow based on the reference flow.

The type and quality of wear for valve unit 7 can also be inferred from a comparison between characteristics c-d in their totality.

Reference is made to Standard EN60534—Part 8—¾ with respect to the use of sound level data and the execution of sound calculations.

The features disclosed in the preceding specification, figures and claims can be significant both individually and in any combination for realizing the invention in various embodiments.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method for quantifying a wear-induced leakage flow on a closed process control valve that restricts a process stream, comprising the steps of:
    using said process control valve when it is intact and does not yet have a wear-induced leakage as a reference control valve or another process control valve of a same design as said process control valve which does not have wear-induced leakage as said reference control valve to determine several reference flow values in advance by placing the reference control valve in several reference opening positions, and measuring the respective reference flow value for each of the reference opening positions;
    when determining each of the respective reference flow values, allocating a respective reference mechanical vibration acquired in an environment of the reference control valve to each of the respective reference flow values;
    determining an instantaneous mechanical vibration caused by said wear-induced leakage flow on said closed process control;
    determining an instantaneous stream force prevailing on said process control valve;
    identifying one of the respective reference mechanical vibrations coming closest to the determined instantaneous mechanical vibration by way of an identity comparison or approximation comparison;
    defining said identity comparison or approximation based on the determined instantaneous stream force; and
    equating the wear-induced leakage flow to be quantified with the respective reference flow value allocated to the one identified reference mechanical vibration.

2. The method according to claim 1 in which the reference opening positions are selected such that their passage cross sections correspond to typical leakage passage cross sections based on wear history data of control valves corresponding to a design of the process control valve.

3. The method according to claim 1 in which a sound level/opening position characteristic is generated for the intact reference control valve, so as to allocate each determined instantaneous mechanical vibration by way of the characteristic to the reference opening position, said reference opening position being output as a leakage opening of the process control valve.

4. The method according to claim 1 in which the instantaneous mechanical vibration is monitored, and a warning signal is output when a permissible reference mechanical vibration value prescribed in advance has been exceeded.

5. The method according to claim 1 in which a progression of the instantaneous mechanical vibration is acquired while opening the process control valve and compared to a reference progression of the reference mechanical vibration while opening the intact reference control valve.

6. The method of claim 1 in which the process fluid stream has a substantially constant stream pressure.

7. The method according to claim 1 in which a reference process fluid stream pressure prevailing on the reference control valve is acquired in advance, and a reference flow value is determined from it, and wherein the reference process fluid stream pressure is also compared with an instantaneous process fluid stream pressure determined on the process control valve so as to identify the closest respective reference mechanical vibration.

8. The method according to claim 7 in which the instantaneous stream pressure prevailing on the process control valve is determined via a pneumatic driving pressure to be applied for keeping the process control valve in its closed position.

9. The method according to claim 7 in which the instantaneous stream pressure prevailing directly on the process valve or an instantaneous flow just before the process control valve closes is determined and stored, and the reference mechanical vibration to be allocated for the leakage flow to be quantified is detected taking into account the instantaneous stream pressure prior to the closing process.

10. A device for quantifying an instantaneous leakage flow on a closed process control valve that restricts a process fluid stream, comprising:
    a data memory that stores:
        several reference flow values determined by using said process control valve when it is intact and does not yet have a wear-induced leakage as a reference control valve or another process control valve of a same design as said process control valve which does not have wear-induced leakage as said reference control valve to determine said several reference flow values in advance by placing the reference control valve in several reference opening positions, and measuring the respective reference flow value for each of the reference opening positions; and
        several sets of sound-level/opening-position value pairs generated based on respectively process fluid stream forces prevailing on the process control valve;
    a pressure sensor configured to determine a pneumatic driving pressure of a pneumatic actuating drive of the process control valve, and determine an instantaneous process fluid stream force prevailing on the process control valve based on the determined pneumatic driving pressure, or a stream force sensor configured to measure said instantaneous process fluid stream force prevailing on the process control valve;
    a mechanical vibration sensor and a data processing electronics used, when determining each of the respective reference flow values, to allocate a respective reference mechanical vibration acquired by said vibration sensor in an environment of the reference control valve to each of the respective reference flow values;

also with said mechanical vibration sensor or another mechanical vibration sensor determining an instantaneous mechanical vibration caused by said wear-induced leakage flow on said closed process control valve; and said data processing electronics being configured to:
  identify one of the respective reference mechanical vibrations coming closest to the determined instantaneous mechanical vibration by way of an identity comparison or approximation comparison in one of said several sets of sound-level/opening-position value pairs based on the instantaneous process fluid stream force prevailing on the process control valve; and
  equate the wear-induced leakage flow to be quantified with the respective reference flow value allocated to the one identified reference mechanical vibration.

11. The device of claim 10 wherein the process fluid stream has a substantially constant stream pressure.

12. The device of claim 10, wherein application of the pneumatic driving pressure places and keeps the process control valve in its closed position.

* * * * *